Oct. 29, 1940.    R. B. BOURNE    2,219,803
FREQUENCY ANALYZER
Filed Aug. 8, 1938    2 Sheets—Sheet 1

INVENTOR
ROLAND B. BOURNE
BY Chapin + Neal
ATTORNEYS

Oct. 29, 1940.                R. B. BOURNE                 2,219,803
                            FREQUENCY ANALYZER
                         Filed Aug. 8, 1938          2 Sheets-Sheet 2
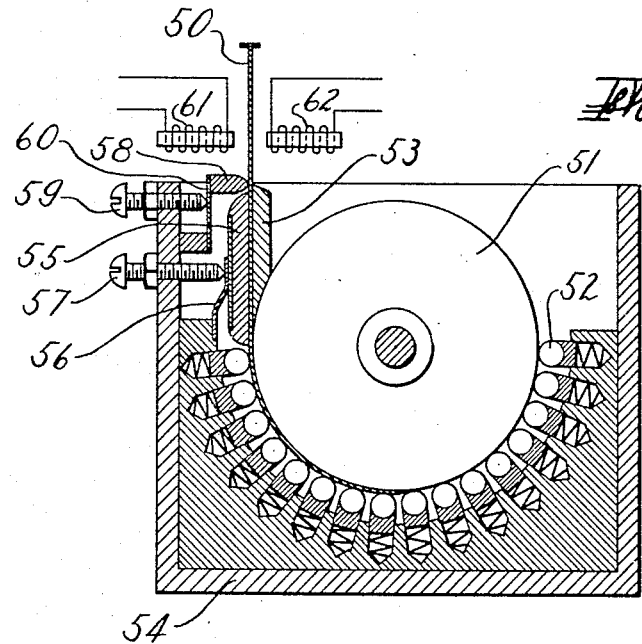
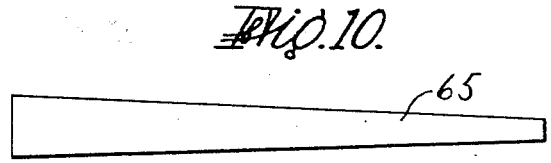
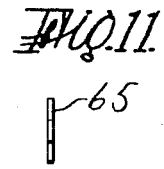
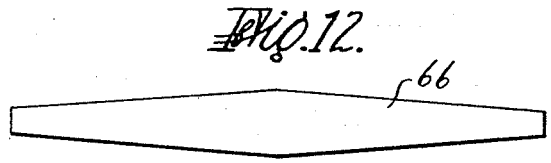
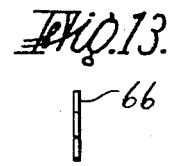
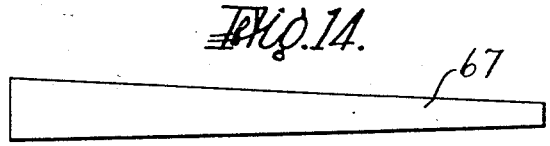
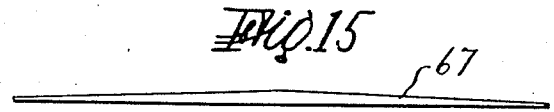
INVENTOR
ROLAND B. BOURNE
BY
Chapin + Neal
ATTORNEYS Patented Oct. 29, 1940

2,219,803

UNITED STATES PATENT OFFICE 2,219,803

FREQUENCY ANALYZER

Roland B. Bourne, West Hartford, Conn., assignor to The Maxim Silencer Company, Hartford, Conn., a corporation of Connecticut Application August 8, 1938, Serial No. 223,651

21 Claims. (Cl. 175—368)

This invention relates to a continuously variable frequency analyzer embodying a single reed of varying effective length. Frequency analyzers of the reed type are well known, but so far as I am aware have always utilized a plurality of reeds each tuned to a particular frequency. Not only are such devices cumbersome, but owing to their fundamental nature they are limited in accuracy to the difference in frequency between two adjacent reeds. They cannot, therefore, determine the impressed frequency exactly. In the device of the present invention a single reed is used, the effective length of which may be varied accurately and progressively so that exact readings over a wide range may be secured with an apparatus of great compactness and ruggedness. By reason of the combined range and compactness of the device it is easily portable, so that investigations in the field may be easily undertaken of machine vibrations, and air-borne pulsations or sound waves such as are ordinarily encountered in connection with internal combustion engine exhausts and intakes or the like.

A further object of the invention is to improve the accuracy with which the maximum amplitude of vibration of a reed may be observed visually.

A further object of the invention is to provide a frequency analyzer in which the impressed vibrations are amplified by mechanical resonance and are then translated for observation into electric oscillations.

A further object is to provide a mechanical construction in which there will be no back-lash, so that the same reading will be obtained in whichever way the position of maximum vibration is approached.

A further object is to improve the approximation to a straight-line response given by the device, whereby the change in length of the reed for equivalent changes in frequencies may be brought into greater uniformity throughout the range of the device.

Additional objects will appear from the following description and claims.

Referring to the drawings:

Fig. 9 is a transverse section of a modified form of the invention;

Fig. 10 is a view of a modified form of reed;

Fig. 11 is an end view thereof;

Fig. 12 is a view of another form of reed;

Fig. 13 is an end view thereof;

Fig. 14 is a view of another form of reed; and

Fig. 15 is a side view thereof.

Figure 1:
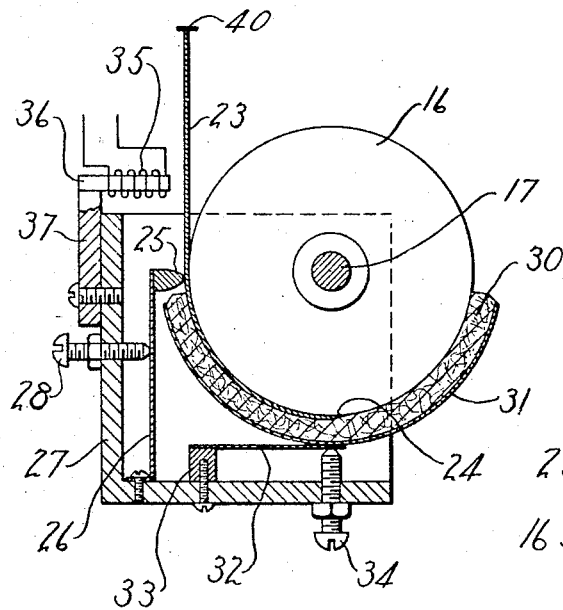
Fig. 1 is a transverse section through a preferred embodiment of the invention.
Figure 2:
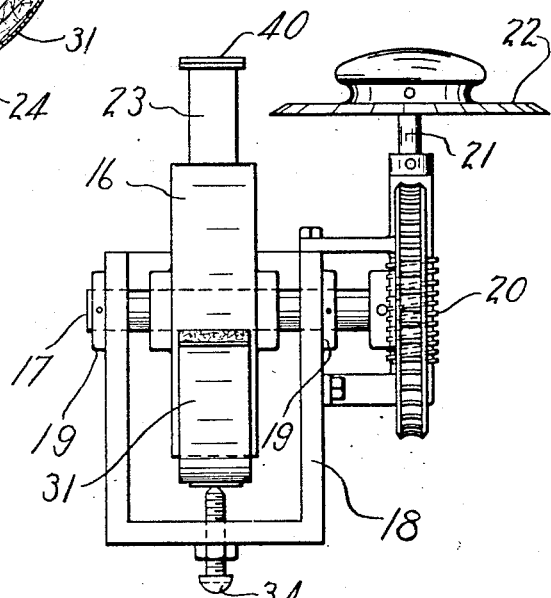
Fig. 2 is a side elevation of the mechanism shown in Fig. 1.

Referring to the drawings, the device consists of a drum or wheel 16 rigidly secured to a shaft 17 which turns in bearings in side frame members 18. Collars 19 are affixed to the shaft 17 to prevent any end motion thereof. The drum is turned by a worm gear connection 20 with a shaft 21 having a suitable dial 22 by which readings may be taken.

Affixed to and partially wound upon the periphery of the drum 16 is a normally straight reed 23, formed of resilient material, preferably spring steel. That portion of the reed which is free is the active part, while that part of the reed which is wound on the drum is completely inactive as far as any vibration is concerned. The free portion of the reed takes a direction tangent to the periphery of the drum due to its inherent tendency to assume its normally straight condition. The drum end 24 of the reed is securely fastened to the drum as by brazing, whereby the reed moves positively with the drum as it is rotated, and is preferably beveled as shown. The point of tangency between the reed and drum and therefore the point of fixture as far as any transverse vibration of the reed is concerned is determined by a polished lug 25 which presses tightly enough on the periphery of the drum 16 to prevent any chattering at that point. The lug 25 is mounted upon a stiff flat spring 26 which is secured to the end frame member 27. The spring 26 is made of bronze having substantially the same thermal expansion coefficient as the side frame members. The spring 26 is parallel to the free portion of the reed so that the pressure of the lug is always normal to the drum. It will be seen, therefore, that the point of tangency of the reed is fixed. The amount of pressure exerted by the lug 25 upon the reed is regulated by an adjusting screw 28 mounted in the frame.

When the free portion of the reed is to be shortened, the drum 16 is turned in a counterclockwise direction whence the reed is wound on the drum. Conversely, to lengthen the free portion of the reed, the drum is turned in a clockwise direction. Since considerable friction exists between the reed and the lug 25, the reed tends to push away from the drum between the point where it is fastened thereto and the lug. This would prevent a given angular motion of the drum corresponding to a definite elongation of the free portion of the reed. To prevent this, I make use of a pad of same material such as soft leather or felt. This pad 30 is affixed to a curved backing member 31 preferably made of spring bronze and so proportioned that it extends from a point on the periphery of the drum in close adjacency to the lug 25 to a point about half way around said drum. The necessary peripheral extent of the pad is determined by the amount of reed to be wound upon the drum when the free portion of said reed is in its shortest adjustment. In the present instance it is convenient to use an angular motion of about 180 degrees. The curved member 31 is held in position by being fixed rigidly to a flat tangentially disposed spring member 32 which is affixed to a rigid post 33 mounted on the frame. This construction prevents any angular motion of the pad as the drum is turned. The pressure of the pad 30 is regulated by an adjusting screw 34 which passes through the frame. This pressure is made sufficiently great to prevent any buckling of the wound portion of the reed. Should any buckling occur when the reed is extruded it will be evidenced by the fact that a given constant frequency will cause maximum deflection of the reed at one angular position of the drum when the reed is being elongated and at another angular position of the drum when the reed is being shortened. Proper adjustment of the screws 28 and 34 results in a high degree of constancy of calibration regardless of whether the reed is being lengthened or shortened. There is one and only one resonance point. To obtain this result, it is of course necessary to have no play or back-lash in any of the moving parts and to use a relatively massive and rigid frame. The pad 30 also serves to damp the wound portion of the reed and the drum.

The reed is energized by a coil 35 having a soft iron core 36 fastened to one pole of the permanent magnet 37 which is affixed to the frame. The end of the pole piece 36 is distant from the flat side of the reed by an amount sufficient to prevent the reed striking it when vibrating and sufficiently close to the lug 25 to permit the alternating magneting field to affect the reed when the latter is used at its shortest position. An alternating current having the frequency to be analyzed is impressed upon the coil 35 in any desired way. For example, a sound wave may be picked up by a microphone which controls an amplifier. The output of the amplifier is connected to the coil 35. If the vibration is mechanical and of sufficient intensity the reed may be caused to oscillate without using the coil 35, merely by resting the casing of the device against the vibrating body.

It is customary, in order to observe visually the vibration of the end of the reed, to provide it with a light colored tip, round or rectangular. In the ordinary type of reed analyzer this construction is satisfactory because the operator has only to compare the magnitudes of the vibrations of adjacent reeds. In the present single reed analyzer it is necessary to determine the setting of the dial 22 which produces maximum oscillation, a much more critical observation, and one not helped in this case by other adjacent reeds which might serve as a basis of comparison. I have, therefore, designed a new type of visual indicator for the reed, here shown in two forms.

Figure 3:
Fig. 3 is a detail of one form of visual indicator for the reed.
Figure 4:
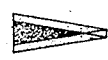
Figs. 4 and 5 are views showing the manner of use of the indicator.
Figure 5:
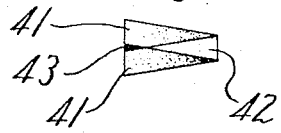

In the form shown in Figs. 3, 4 and 5, the tip 40 is triangular in form, with its median line along the end of the reed. The oscillation of the reed thus shifts the triangle laterally parallel to its base. In its oscillation the triangle comes to rest at each end of its swing, and travels rapidly at an intermediate point. The visual effect will be that of two overlapping triangles 41 joined by a lighter triangle in the region where the tip is seen only in motion. There is also a triangle 43 where the two triangles of rest overlap, which is the most prominent portion of the pattern. The altitude of this triangle changes very rapidly in proportion to a change in the magnitude of the swing of the reed, so that its apex gives the effect of a visible point approching the base of the triangle until resonance is reached and then receding from it. This rectilinear motion is much easier to follow than is the constant comparison of the width of the rectangular band made by the vibration of a rectangular tip. So accurately is it possible to detect the resonance point by this means that I have found it possible to determine the frequency of the impressed force to within half a cycle. In the use of this device it is necessary to vary the intensity of the impressed force by suitable controls so that the maximum amplitude of oscillation of the tip will not cause triangle 43 to disappear.

Figure 6:
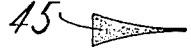
Fig. 6 is a detail of another form of visual indicator.
Figure 7:
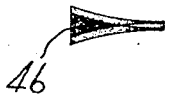
Figs. 7 and 8 are views thereof corresponding to Figs. 4 and 5.
Figure 8:

Figs. 6, 7, and 8 show an end tip 45 of a different shape, valuable when it is desired to detect the resonant condition for vibrations of small amplitude. The tip 45 has curved sides so that the triangle 46 formed by the overlapping of the two extreme positions of the tip recedes very rapidly for small changes in amplitude of swing.

Fig. 9 shows another embodiment of the invention having unique features. In this case the reed 50 is partially wound upon the periphery of the drum 51, the wound portion being held snugly against the drum by a multiplicity of spring pressed rollers 52. These may be mounted in any convenient manner on the frame of the device. The reed 50 leaves the periphery of drum tangentially but instead of being free, as before, it is pressed against a tangentially disposed member 53, which is affixed to the frame 54, by a pressure pad 55, held by a flat spring member 56 provided with an adjusting screw 57. Opposite the distant end of the flat member 53 is a lug 58 which may be adjusted to exert a proper pressure on the reed by means of the screw 59 bearing against its spring 60. The purpose of this rectilinear extension of the non-vibrating portion of the reed is to provide space for two electro-magnetic devices positioned on opposite sides of the reed in proximity to the fixed end thereof. These units comprise the driving unit 61 and the pick-up unit 62. The driving unit functions as heretofore described. The pick-up unit generates a small E. M. F. when the reed is in vibration. This E. M. F. may be amplified and used to energize a vacuum tube voltmeter for the purpose of obtaining quantitative readings corresponding to various frequencies of a complex sound spectrum. In the device of Fig. 9, the rollers may of course be replaced by the pad 30 of Fig. 1.

In practice, the device in either form is mounted so that the reed is either vertical or with the flat side thereof in a plane at right angles to a horizontal plane. This is done in order to overcome the effect of gravity upon the reed, which might otherwise disturb its calibration.

The reeds shown in Figs. 12 to 15 are designed to improve the uniformity of response throughout the entire range of the device. With a reed of uniform cross-section the frequency of its normal vibration varies inversely as the square of its length. In the apparatus here shown the readings on the dial 22 correspond to the free length of the reed and the frequency corresponding thereto is determined from a calibration chart. This is more accurate than graduating the dial directly in terms of frequency, which could be done if desired. The nature of the response can best be seen from the calibration curve, which on account of the inverse square is parabolic in form. For small reed lengths wide variations in frequency response are obtained for small changes in the length; but as the reed length becomes longer similar changes in length produce only small variations in frequency.

To equalize the response to some extent I resort to the expedients shown in Figs. 10 to 15, all of which employ a reed of non-uniform cross-sectional area along its length, and produce a curve more nearly approximating a straight line in the useful part of its length than is possible with a reed of constant cross-section. Figs. 10 and 11 show a reed 65 tapered in width from one end to the other. Figs. 12 and 13 show a reed 66 widest at its mid-point and tapering off towards each end. Figs. 14 and 15 show a reed 67 tapered in width from one end to the other and of a thickness decreasing from its mid-point towards each end. This form of reed gives a straighter calibration curve than either of the other forms but is more difficult to manufacture.

I claim:

1. A continuously variable frequency analyzer comprising a reed having a free end, a member pressing against the reed to produce a fixed end, means including a drum upon which the reed is wound for varying the projection of the free end of the reed beyond the fixed end, and means for impressing upon the free portion of the reed a frequency to be analyzed.

2. A continuously variable frequency analyzer comprising a reed having a free end, a member pressing against the reed to produce a fixed point, means including a drum upon which the reed is wound for varying the projection of the free end of the reed beyond the fixed point, and means including the drum for holding snugly on both sides the entire length of the reed on the drum side of said fixed point.

3. A continuously variable frequency analyzer comprising a reed having a free end, a member pressing against the reed to produce a free end, means including a drum upon which the reed is wound for varying the projection of the free end of the reed beyond the fixed end, a pressure plate shaped to conform to the peripheral surface of the drum, and means for adjusting the pressure of said plate upon the drum.

4. A continuously variable frequency analyzer comprising a reed having a free end, a member pressing against the reed to produce a free end, means including a drum upon which the reed is wound for varying the projection of the free end of the reed beyond the fixed end, and a series of rollers mounted to press the wound portion of the reed tightly against the cylindrical surface of the drum.

5. A continuously variable frequency analyzer comprising a self-supporting reed of spring metal having its mass and elasticity distributed throughout its length, a device holding the reed from one end all the way to a clamping point intermediate its length leaving the other end of the reed free, and means for varying the position of the clamped point along the reed.

6. A continuously variable frequency analyzer comprising a self-supporting reed of spring metal having its mass and elasticity distributed throughout its length non-uniformly, with the greater stiffness intermediate the length of the reed, a device engaging and fixing the portion of the reed at an intermediate point of its length leaving one end of the reed free, means for varying the relative position of said device along the length of the reed, and means for impressing upon the reed a force having the frequency to be analyzed.

7. A continuously variable frequency analyzer comprising a rotatable drum, a normally straight, flexible, spring metal reed mounted on the periphery of the drum and partially wound thereon, reed guiding means tangential to the drum to guide the reed to and from contact with the drum and to determine a fixed end for the reed, means for holding the wound-up portion of the reed snugly to the drum, and means for impressing upon the reed a force having the frequency to be analyzed.

8. A continuously variable frequency analyzer comprising a reed free at one end and supported rigidly between two relatively movable members, to one of which the reed is secured and against which it bears throughout all of its length except said free portion.

9. A continuously variable frequency analyzer comprising a reed free at one end and supported rigidly between two relatively movable members, to one of which the reed is secured and against which it bears throughout all of its length except said free portion, and means for pressing the reed against said last-named member.

10. A continuously variable frequency analyzer comprising a normally straight spring metal reed and opposed guide walls positioned to receive a portion of the reed between them and to confine it against lateral deflection, one of said guide walls being composed at least in part of a moving surface to which the reed is attached.

11. A continuously variable frequency analyzer comprising a normally straight spring metal reed, and opposed guide walls positioned to receive a portion of the reed between them and to confine it against lateral deflection and forming between them a reed clamp beyond which the reed is free from restraint, one of said guide walls being composed at least in part of a moving surface to which the reed is attached.

12. A continuously variable frequency analyzer comprising a normally straight spring metal reed, and opposed parallel guide walls positioned to receive a portion of the reed between them and to confine it against lateral deflection and forming between them a reed clamp beyond which the reed is free from restraint, one of said guide walls being composed in part of a rotatable drum to the periphery of which the reed is attached, and in part of a straight member having its reed-guiding surface tangent to the drum.

13. A continuously variable frequency analyzer comprising a normally straight, magnetic, spring metal reed, opposed guide walls positioned to receive a portion of the reed between them and to confine it against lateral deflection and forming between them a reed clamp beyond which the reed is free from restraint, one of said guide walls being composed at least in part of a rotatable drum to the periphery of which the reed is attached, and an electro-magnetic driving unit positioned adjacent the free portion of the reed.

14. A continuously variable frequency analyzer comprising a normally straight, magnetic, spring metal reed, opposed guide walls positioned to receive a portion of the reed between them and to confine it against lateral deflection and forming between them a reed clamp beyond which the reed is free from restraint, one of said guide walls being composed at least in part of a rotatable drum to the periphery of which the reed is attached, an electro-magnetic driving unit positioned adjacent the free portion of the reed, and an electro-magnetic pick-up unit also positioned adjacent the free portion of the reed.

15. A device of the class described comprising a frame, a rotatable drum mounted in said frame, a reed having a portion thereof wound upon the periphery of said drum and a portion extending tangentially therefrom, a member pressing said wound portion of said reed against the periphery of said drum and means for adjusting the pressure of said member against said reed.

16. A continuously variable frequency analyzer comprising a rotatable drum, a reed of normally straight spring material partially wound upon the periphery of the drum so as to be positively movable therewith, a lug so proportioned as to make a line contact with the reed at right angles to the length thereof and positioned to press the reed against the drum to determine the point of tangency thereof, and means for adjusting the pressure of the lug against the reed.

17. A continuously variable frequency analyzer comprising a self-supporting reed of spring metal having a cross-sectional area varying throughout its length, a device holding the reed from one end all the way to a clamping point intermediate its length leaving the other end of the reed free, and means for varying the position of the clamped point along the reed.

18. A continuously variable frequency analyzer comprising a self-supporting reed of spring metal of uniform thickness and tapering progressively from one end to the other, a device holding the reed from one end all the way to a clamping point intermediate its length leaving the other end of the reed free, and means for varying the position of the clamped point along the reed.

19. A continuously variable frequency analyzer comprising a self-supporting reed of spring metal varying progressively in cross-sectional area from one end to the other, a device holding the reed from one end all the way to a clamping point intermediate its length leaving the other end of the reed free, and means for varying the position of the clamped point along the reed.

20. A continuously variable frequency analyzer comprising a self-supporting reed of spring metal having a visual tip tapering substantially to a point in a direction transverse to the direction of oscillation, a device holding the reed from one end all the way to a clamping point intermediate its length leaving the other end of the reed free, and means for varying the position of the clamped point along the reed.

21. A continuously variable frequency analyzer comprising a self-supporting reed of spring metal having a substantially triangular visual tip tapering substantially to a point in a direction transverse to the direction of oscillation, the sides of the triangle being incurved, a device holding the reed from one end all the way to a clamping point intermediate its length leaving the other end of the reed free, and means for varying the position of the clamped point along the reed.

ROLAND B. BOURNE.